United States Patent [19]

Brown et al.

[11] 3,793,079

[45] Feb. 19, 1974

[54] BATTERY ELECTROLYTE COMPOSITION

[75] Inventors: Henry Brown, Huntington Woods; Donald H. Becking, Birmingham, both of Mich.

[73] Assignee: Occidental Energy Development Company, Madison Heights, Mich.

[22] Filed: Nov. 18, 1971

[21] Appl. No.: 200,220

[52] U.S. Cl. .................................. 136/30, 136/155
[51] Int. Cl. .......................................... H01m 43/06
[58] Field of Search ......... 136/6, 30, 107, 154, 155; 204/40, 55 R, 55 Y; 260/556 AR, 556 S

[56] References Cited
UNITED STATES PATENTS

| | | | |
|---|---|---|---|
| 3,653,965 | 4/1972 | Lee | 136/30 |
| 2,766,284 | 10/1956 | Shenk | 204/49 |
| 3,186,926 | 6/1965 | Hofmann et al. | 204/55 R |
| 3,348,973 | 10/1967 | Dirkse | 136/30 |
| 3,640,771 | 2/1972 | Zito | 136/30 |
| 3,655,534 | 4/1972 | Kampe | 204/55 R |

*Primary Examiner*—Donald L. Walton
*Attorney, Agent, or Firm*—William J. Schramm

[57] ABSTRACT

An electrolyte composition for use in an electrical energy storage device such as the battery, and, particularly a rechargeable secondary type battery comprising an aqueous solution containing a metal halide and an effective dendrite reducing amount of a soluble organic compound containing an oxygen ether group and a group of a structure $-SO_2NH-$.

39 Claims, No Drawings

BATTERY ELECTROLYTE COMPOSITION

BACKGROUND OF THE INVENTION

So-called high energy density (H.E.D.) electric energy storage devices or batteries are conveniently defined as those which are capable of supplying at least about 50 watt hours of electric power per pound of battery weight. Various structural combinations and/or chemical compositions have heretofore been used or proposed for use as H.E.D. secondary storage batteries which may conveniently be recharged repeatedly and which, due to their compactness and high energy storage capacity, render them eminently adaptable for a wide variety of uses, of which vehicle power supply systems constitute a particularly important application. As far as is known, none of the prior art type secondary electric storage batteries have been entirely satisfactory for one of a number of reasons including the high cost of the materials and/or constructions used, their low energy storage capacity, the excessively long time and/or inefficiency in effecting a recharging thereof, their comparatively short useable operating life, the potential toxicity and danger of the chemical constituents employed therein, the complex control and/or systems necessary to monitor and control their operation and the like.

A recent breakthrough in the H.E.D. secondary battery art was made by the advent of an electrical storage system utilizing a halogen hydrate in combination with an aqueous electrolyte containing a dissolved metal halide disposed in communicative contact with at least one pair of electrodes, of which the negative electrode is comprised of an oxidizable metal. In accordance with the foregoing system, the halogen hydrate is consumed during the electrical discharge of the battery accompanied by a progressive consumption of the metallic electrode, thereby forming the corresponding metal halide. The specific details of he foregoing storage battery are described in U.S. Pat. application Ser. No. 50,054, filed Jun. 26, 1970 now U.S. Pat. No. 3,713,888, of the present invention. The teachings of the aforementioned U.S. Pat. application Ser. No. 50,054 are incorporated herein by reference and to which reference is made for further details of a battery system to which the present invention is applicable.

A continuing problem associated with secondary or rechargeable batteries of the types heretofore known, including the H.E.D. battery described in the foregoing pending United States Patent Application, is the slow rate at which such batteries must be recharged, in addition to the non-uniform redeposition of metal on the electrode during such recharging processes which, under aggrevated situations, form dendrites and/or nodules bridging the spaces between electrodes and short circuiting the system.

Other problems arise when an additive approach is followed in eliminating dendrite formation. Stability of the additive is needed not only to repeat recycling but also to the environment. One may not be able to use the additives that have previously been used in the electrodeposition of metals, such as zinc because the anodes in a rechargeable system are not consumable as they are in electroplating. During charging of the battery, halogen is evolved which may interfere with the metal deposition. Further the additives may act as an inhibitor to the attack of the metal by the halide as well as an inhibitor of halogen reduction to halide at the cathode. Lastly, it has been found that some additives tend to precipitate or salt out during repeated recharging. An example of such additives are benzotriazole, benzene sulfonamide, toluene sulfonamide, chlorototoluene sulfonamide and thiourea.

The improved electrolyte composition comprising the present invention overcomes the foregoing problems by enabling a recharging of metal halide secondary batteries at a rate practical for normal use and wherein the metal is redeposited during the recharging process in the form of a substantially smooth, dense and adherent metallic deposit, thereby substantially prolonging the useful operating life of such batteries.

SUMMARY OF THE INVENTION

The benefits and advantages of the present invention are achieved by employing a novel electrolyte composition in an electrical energy storage device or battery having an electrode area containing at least one positive and one negative electrode and a storage area for a halogen hydrate which is disposed in communication with the electrode area. The electrolyte composition preferably comprises an aqueous solution containing a metal halide in which the metallic constituent comprises a metal selected from Group IIB preferably, and the halide constituent comprises a halogen such as chlorine and bromine, as well as mixtures thereof. The metal halide concentration may range from a concentration of about 0.1 percent up to a concentration approaching a saturation of the electrolyte. In addition, the electrolyte contains a soluble organic compound containing an oxygen ether group and a group of the structure $-SO_2 NH-$ and is present in an amount broadly ranging from about 0.001 percent by weight to about 10 percent by weight and preferably from about 0.005 percent to about 1.0 percent by weight.

The soluble organic compounds are further characterized as being soluble in the electrolyte solution under the operating temperatures encountered and do not adversely effect the structural components of which the battery is comprised. A particularly satisfactory electrolyte composition comprises an aqueous solution of zinc chloride containing about 0.1 percent by weight p,p' -oxy-bis (di-benzene sulfonimide) which is the compound recited in U.S. Pat. No. 2,766,284, Column 1, line 33.

Additional benefits and advantages of the present invention will become apparent upon a reading of the description of the preferred embodiments, taken in conjunction with the specific examples provided.

DESCRIPTION OF PREFERRED EMBODIMENTS

It will be understood that the concentrations of the several ingredients in the electrolyte as herein described and as set forth in the subjoined claims are expressed in terms of percentages by weight, unless expressly indicated otherwise.

The electrolyte broadly comprises a solution containing a dissolved metal halide, a soluble organic compound containing an oxygen ether group and a group of the structure $- SO_2 NH -$ and dissolved and/or entrained halogen gas formed during the charging of the battery. On discharge the electrolyte may contain halogen hydrate or more usually the decomposition products of halogen hydrate, i.e., halogen and water. In addition to the foregoing, other ingredients can be included for providing further controlled variations and changes in the physical and chemical properties of electrolyte including modification of the corrosiveness of the electrolyte to the battery components, controlled variations in the electric conductivity of the electrolyte, etc. In the more usual and preferred form, the electrolyte consists essentially of an aqueous solution containing from about 0.1 percent up to a saturated concentration of a metal halide consisting of metals selected from the group consisting of the Group VIII of the Periodic Chart (namely: Fe, Co, Ni, Ru, Rh, Pd, Os, Ir and Pt), metals of the Lanthanum Series (namely: Ce, Pr, Nd, Pm, Sm, Eu, Gd, Tb, Dy, Ho, Er, Tm, Yb and Lu), and Actinium Series (namely: Th, Pa, U, Np, Pu, Am, Cm, Bk and Cf), in addition to Zn, Sc, Ti, V, Cr, Mn, Cu, Ga, Y, Zr, Nb, Mo, Tc, Ag, Cd, In, Sn, Hf, Ta, W, Re, Au, Hg, Tl, Pb, Bi, and the like. Of the foregoing metals, zinc constitutes the most preferred metal, while iron, cobalt, and nickel are preferable to the remaining enumerated metals. The preferred halogen constituents are chlorine and bromine, of which the chlorine salts of the preferred metals are particularly suitable and constitute the preferred embodiment. Particularly satisfactory results are obtained employing aqueous solutions containing zinc chloride as the metal halide in combination with an effective dendrite reducing amount of a soluble organic compound containing an oxygen ether group and a group of the structure —$SO_2$ NH—.

The concentration of the aqueous metal halide in the electrolyte may vary from an amount as low as about 0.1 percent to a saturated concentration of the salt. Generally, concentrations of about 5 to 50 percent are used, while concentrations of about 10 percent up to about 35 percent by weight are preferred. In regard to zinc chloride salts, maximum conductivity of the electrolyte occurs at a concentration of about 25 percent by weight and the chlorine hydrate formed during the charging operation occurs at atmospheric pressure. Generally, when zinc chloride is employed as the metal halide, concentrations ranging from about 10 to about 35 percent are preferred.

In addition to the metal halide constituent, the electrolyte incorporates an effective dendrite reducing amount of a soluble organic compound containing an oxygen ether group and a group of the structure —$SO_2$ NH— which as previously indicated, may be present in an amount broadly ranging from about 0.001 percent to about 10 percent, more usually from about 0.005 to about 1 percent, and preferably from about 0.005 to about 0.5 percent of the electrolyte. The ether portion of the organic compound may be a diaryl ether or an aryl-alkyl ether unsubstituted or substituted such as described below. A particularly preferred compound is one which contains — $SO_2$—NH—$SO_2$—.

One class of compounds that may be used in the present invention is of the structure:

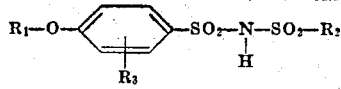

wherein
$R_1$ is an aliphatic group or an aryl or a group of the formula:

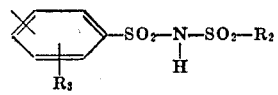

wherein
$R_2$ may be an aliphatic group, aryl group or an aralkyl group;
$R_3$ is an alkyl of one to four carbon atoms, halogen, such as chloro, bromo, fluoro, or a water solubilizing group.

In the above formula, examples of an aliphatic group are alkyl of up to 12 carbon atoms, such as methyl, ethyl, propyl, butyl, pentyl, hexyl, decyl, dodecyl, and the like; or an ethylenically unsaturated group of up to 12 carbon atoms, such as —CH=CH—; $CH_2$—CH=CH—; —$C(CH_3)_2$—CH=CH—, and the like; preferably, the number of carbon atoms may be up to six and even more preferably up to four for the alkyl or the ethylenically unsaturated groups.

In formula I, examples of aryl are phenyl, naphthyl, biphenyl, and the like. Examples of aralkyl are those groups that contain up to 12 carbon atoms, preferably up to eight carbon atoms, such as benzyl, —CH($CH_3$)—$C_6H_5$; —$(CH_2)_3$—$C_6H_5$; —CH($CH_3$)—$(CH_2)_4$—$C_6H_5$ and the like.

The aliphatic, aryl or aralkyl groups may also be substituted by one or more water solubilizing groups.

By "water solubilizing group" is meant any polar group which will assist in the solubilization of the molecule in the aqueous electrolyte. Preferred groups are hydroxyl, ether, such as alkoxy, of up to 12 carbon atoms, polyoxyalkylene, such as polyoxyethylene of up to 1,000 repeating units or polyoxypropylene of up to 50 repeating units, sulfonic, sulfate, nitro, carboxylic acid or its alkyl esters of from one to six carbon atoms; other groups that may be used are amino, phosphoric or phosphate where the amino is primary, secondary, or tertiary where the hydrogen replacement on the amino group has from one to six carbon atoms.

Examples of some compounds which fall within the above generic formula are as follows:

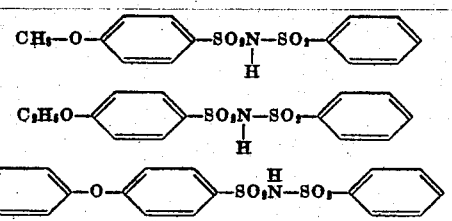

A preferred class of compounds are those of formula II, III, IV.

Formula II

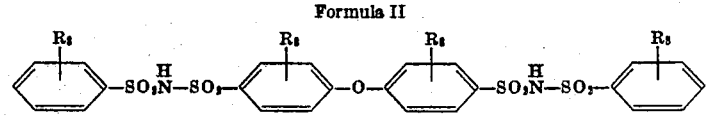

Formula III

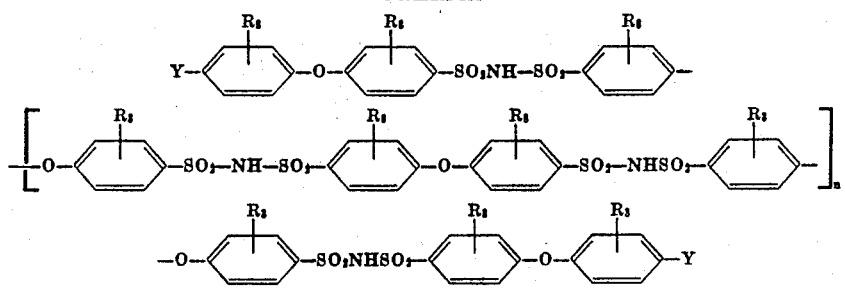

Formula IV

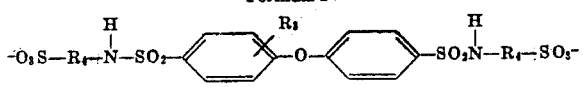

wherein

R₃ is as described above;
R₄ is a straight or branched chain saturated alkylene of up to 12 carbon atoms, aryl, cyclic alkyl of from five to eight carbon atoms, or aralkyl of up to 12, preferably eight carbon atoms; and wherein aryl or aralkyl are described above; cyclic alkyl may be cyclohexyl, cycloheptyl, cyclo-octyl and the like; the saturated alkylene may be $-CH_2-$; $-(CH_2)_2-$; $-(CH_2)_3-$; $-(CH_2)_4-$; $-(CH_2)_6-$; $-(CH_2)_8-$; $-(CH_2)_{10}-$; $-(CH_2)_{12}-$ and the like; and wherein Y is $-SO_3^-$ or $-SO_2NH_2$; and
n is from 1 to 10.

Another type of compound which may be used in the present invention is the type wherein the ether group forms a fused ring with the aryl (phenyl ring) such as a diphenylene oxide or dibenzofuran furan type. In the latter circumstance formula I would be modified as follows:

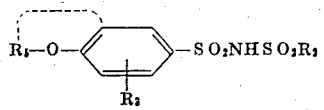

wherein

R₅ is an aryl (phenylene) ring fused to the oxygen heterocyclic ring.

When $^-SO_3$ is employed, it is meant to cover sulfonic acid and its water soluble inorganic salts such as sodium, potassium, zinc, Mg. and the like.

The compounds of formula II are prepared as described in U.S. Pat. No. 2,766,284.

The compounds of formula III are prepared as follows:

After preparing the p, p'oxy-bis (benzene sulfonyl chloride) of Example 1 of U.S. Pat. No. 2,766,284, the sodium salt of formula V is prepared.

Formula V

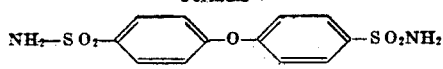

A 20 percent solution of the sodium salt of formula V was prepared by dissolving 35 moles of the compound of formula V in 35 moles of caustic soda in 25 kilograms of water. To this solution was added with stirring 15.7 moles of the disulfonyl chloride of Example 1 of U.S. Pat. No. 2,766,284 over a period of 3 hours at from 75° to 80°C. The pH was adjusted to 9 to 10 by suitable additions of caustic soda. The mixture was stirred an additional 2 hours and diluted to 22 gallons with water and ice. The pH was adjusted to 2.5 with hydrochloric acid. The mixture was filtered at 20°C. to remove excess sulfonimide. The solution was made acidic by the addition of 5 percent hydrochloric acid by weight by dropwise addition of 11.8 liters of concentrated hydrochloric acid over a period of three-fourths hrs. at 60° to 70°C., then allowed to cool and was filtered.

Normally, in this reaction, it is preferred that equimolar amounts of the sulfonyl chloride be reacted with the compound of formula V (Na salt). A polymeric material is obtained because of the difunctional groups on each of the reagents. The resulting product has a number of repeating units as seen in formula III ranging up to 10. Following the procedure above, that is, reacting the sodium salt of formula V with the disulfonyl chloride of Example 1 of U.S. Pat. No. 2,766,284, an oily product was obtained which on standing at room temperature solidified. This material had a melting point of 40°-50°C.

The compounds of formula IV are generally prepared by taking the sulfonyl chloride compound described in Example 1 of U.S. Pat. No. 2,766,284 and reacting it with ammonia to form the diamide. The resulting diamide is converted to the alkali metal salt and is then reacted with a sultone. Generally the reaction is completed, e.g., when propane sultone is the reactant at a pH of about 7.

In general, the solution is an aqueous solution for reacting the diamide and the sultone and the resulting product is highly soluble in water. The temperature for reaction ranges from about 35° to 70°C., preferably 50° to 65°C. In order to obtain the disulphonic grouping, 2 moles of the sultone are reacted with 1 mole of the disulfonamide.

The sultones that may be employed in the present invention are any one of the following structure:

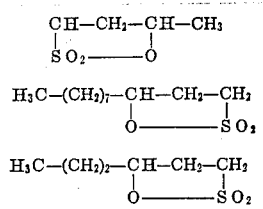

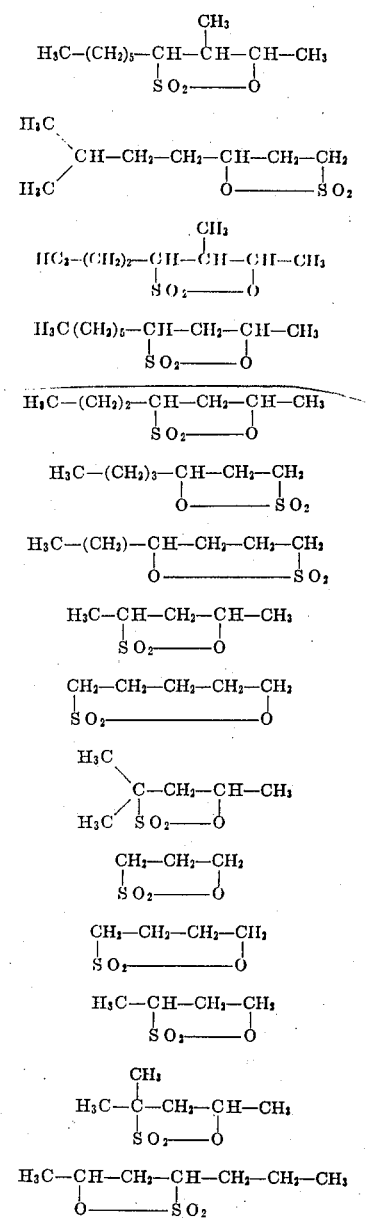
In addition tolyl sultone may be employed which is of the structure:
Formula VI
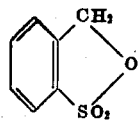
Or other aromatic sultones of the formula:
Formula VII
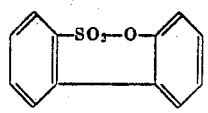
Formula VIII
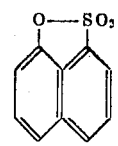
The reactions for the preparation of the compounds of formula I can be described as follows:
A.
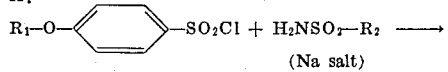
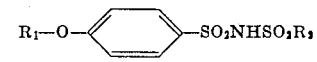
B.
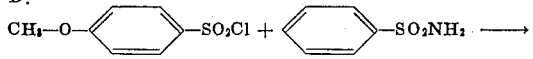
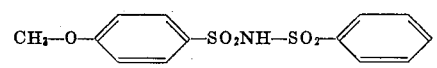
C.
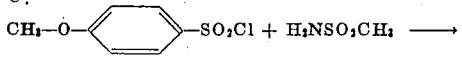
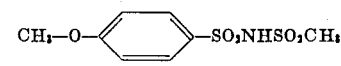
D.
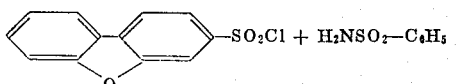
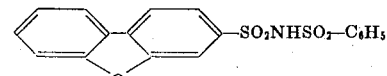
E.
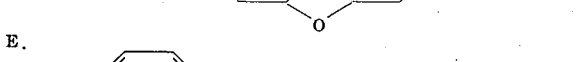
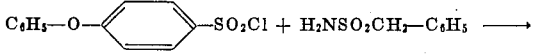
F.
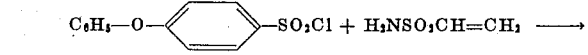
G.
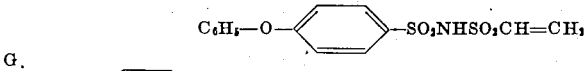
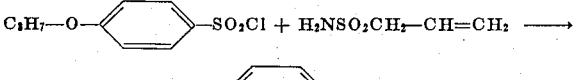
The compounds of formula III may be prepared as follows:
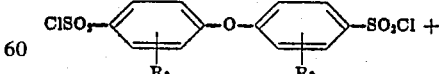
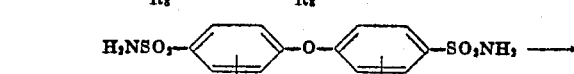
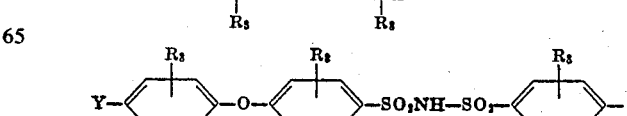

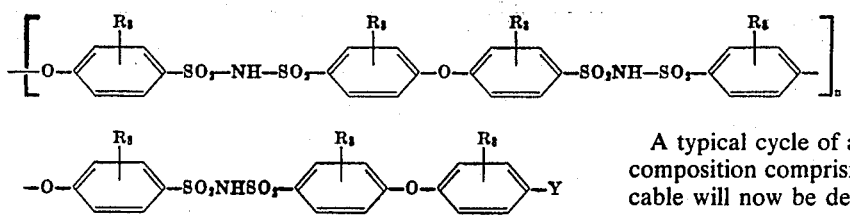

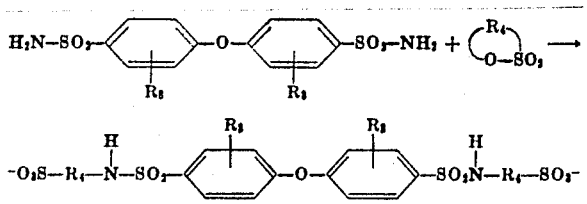

The compounds of formula IV may be prepared as follows:

Another way of preparing the compounds of formula IV is by reacting the sodium salt of formula V (aqueous solution) with a halogenated alkyl sulfonate, such as, chloro- or bromoethane sulfonate (sodium salt) or chloro- or bromopropane sulfonate (sodium salt).

Another way to prepare the compounds of formula IV is by reacting the sodium salt of formula V (aqueous solution) with formaldehyde bisulfite in the liquid phase.

Regardless of the specific chemical composition of the substantially linear polyether material or mixtures thereof, that can be satisfactorily employed in accordance with the foregoing definitions, it is essential that the compounds or mixture of compounds used be soluble in the electrolyte in the specific concentrations required over the temperature range normally encountered during that specific battery use. In addition to the foregoing characteristics, it is also preferred that the additive compound be substantially stable during battery operation to avoid a rapid depletion thereof to levels below that normally required to attain the benefits of the present invention, and preferably to avoid the necessity of frequently or continuously replenishing the additive during the battery operation. From a practical standpoint, the stability of such additive compounds should be such in order to enable the battery to undergo one complete charging cycle without requiring a replenishment of the additive compound. Conveniently, a concentrate of the additive compound can be added to the battery electrolyte as a routine practice immediately prior to the initiation of a charging operation. Additive compounds which are of greater stability would, of course, require less frequent replenishment to maintain the concentration thereof within desired limits.

Still another characteristic of the additive is that the material itself, as well as its decomposition products should be compatible with the chemical composition of the electrolyte, as well as with the materials of which the battery system is composed. The decomposition products are also preferably of a non-toxic quality in order to minimize any hazards to operating personnel.

A typical cycle of a battery to which the electrolyte composition comprising the present invention is applicable will now be described. The battery comprises a closed system including an electrode area containing at least one positive and one negative electrode. During discharge of the battery, the electrolyte contained in a reservoir is circulated to the electrode area by means of a pump at which entrained halogen gas becomes ionized by receiving electrons from the halogen electrode, while a metal of which the other electrode is comprised enters the electrolyte solution as an ion. The voltage potential between the positive and negative electrode causes current to flow, as may be desired, while replenishment of the halogen gas in the electrolyte is achieved by the consumption of a halogen hydrate stored in the storage zone.

During a charging of the battery, the electrodes are connected to an external source of electrical current with a continued circulation of the electrolyte. A halogen gas is formed at the positive electrode while the metal ions in the electrolyte are deposited on the negative electrode. The elemental halogen gas formed at the positive electrode during recharging is carried by means of the electrolyte to a separation zone in which it is maintained at a sufficiently cool temperature to effect a solidification of the halogen hydrate which is separated from the electrolyte and thereafter stored in the storage zone. The electrolyte from the separation zone is again recirculated into the electrode area for entrainment of additional elemental halogen gas formed during the recharging operation, in addition to supplying additional metallic ions to the negative electrode for deposition thereon. The metallic deposition on the negative electrode is carried out in the presence of such elemental halogen gas which presents particular problems in obtaining a uniform and adherent coating suitable for dissolution during the discharge cycle of the battery.

In order to further illustrate the improved electrolyte composition comprising the present invention, the following specific examples are provided. It will be understood that the examples are merely illustrative of various compositions and concentrations suitable for use in accordance with the practice of the present invention and are not intended to be limiting of the compositions as contemplated herein and as set forth in the subjoined claims.

EXAMPLE I

An electrolyte composition was prepared comprising an aqueous solution containing 40 percent zinc chloride and 500 milligrams per liter equivalent to 0.05 percent of the compound of the structure:

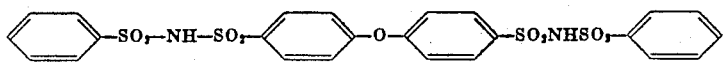

EXAMPLE II

An electrolyte composition was prepared containing 40 percent zinc chloride and 200 milligrams equivalent to 0.02 percent of the compound of Example I.

EXAMPLE III

An aqueous electrolyte solution was prepared containing 40 percent zinc chloride and 1 gram per liter equivalent to 0.1% of the compound of Example I.

EXAMPLE IV

An electrolyte composition was prepared containing 40 percent zinc chloride and 300 milligrams per liter equivalent to 0.03 percent of the compound of Example I.

EXAMPLE V

An aqueous electrolyte solution was prepared containing 40 percent zinc chloride and 50 milligrams per liter equivalent to 0.005 percent of the compound of Example I.

EXAMPLE VI

An aqueous electrolyte solution was prepared comprising an aqueous solution comprising 40 percent zinc chloride and 50 milligrams per liter equivalent to 0.005 percent of the compound of the formula:

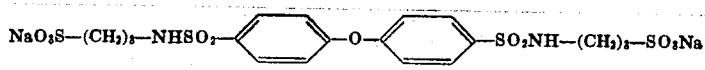

The above compound was prepared by reacting propane sultone (2 moles) with an aqueous solution containing 20 percent by weight of the sodium salt of formula V (1 mole) at a temperature of 50°–60°C. After completion of the reaction, the water solution was evaporated to dryness; the product was extracted with glacial acetic acid and precipitated by adding acetone. The material was dried. The melting point was 284°–288°C. with a nitrogen content of 4.1 percent (theory 4.3 percent).

The electrolyte compositions as described in Examples I - VI above were individually evaluated employing a test cell containing a pair of substantially inert electrical conductive electrodes each having a surface area of about 125 square centimeters. The electrodes were disposed and spaced substantially parallel face-to-face relationship at a distance of 0.05 inches. One electrode was cathodically charged, while the other was anodically charged at a voltage potential to effect a current density of about 8 amperes per square decimeter of electrode area for periods up to about 4 hours. During the charging cycle, the electrolyte solution was circulated between the opposed electrode faces at a substantially constant flow of about 600 milliliters per minute. At the completion of each cell, an inspection of the cathodically charged electrode revealed the formation of a substantially smooth, dense and adherent deposit of zinc metal. The quantity of zinc metal deposited was equivalent to a potential storage of electrical energy of about 55 watt hours per square decimeter of electrode area.

Similar tests were conducted employing the same electrolyte but without any of the additive compounds therein. In each instance, a premature termination of the test was occasioned after relatively short charge periods of only about 45 minutes as a result of the formulation of dendrites and/or nodules bridging the space between the opposed electrode surfaces, effecting a short circuiting of the test cell. An inspection of the quantity of zinc deposited on the cathode electrode revealed an amount equivalent to only about 9 watt hours per square decimeter of electrode area.

EXAMPLE VII

An aqueous electrolyte composition was prepared containing 25 percent zinc chloride and 1 gram per liter equivalent to 0.1 percent of a compound of the formula shown below and having an average molecular weight of about 4,000.

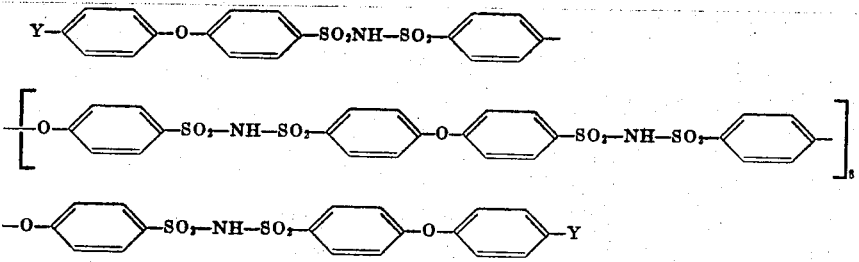

wherein $y = -SO_3^-$ or $-SO_2NH_2$.

The electrolyte composition was placed in a diaphragm-type test cell containing a copper plate as the cathodic electrode on which the zinc metal is to be deposited and an inert plate as the anodic electrode on which the elemental chlorine gas is to be formed during the charge cycle. The opposed surfaces of the electrodes were positioned in a parallel relationship at a distance of 0.120 inch with a permeable diaphragm disposed midway therebetween overlying substantially the entire electrode areas. Each electrode surface was of an area of about 125 square centimeters. Two separage streams of electrolyte was circulated past the electrode faces being separated by the intervening diaphragm, with each stream having a flow rate of three milliliters per second per electrode face. A voltage was applied across the electrodes to effect a current flow of 10 amps for a period of seven hours, whereafter the test was terminated and the copper electrode removed and inspected. The metallic zinc deposited on the surface of the copper electrode was found to be of a smooth, dense and adherent structure and totalling 84 grams in weight. The quantity is equivalent to about 140 watt hours of stored potential electrical energy.

Under the identical test conditions utilizing the same electrolyte, but devoid of any of the additive only 20 amp hours (24 grams) of zinc metal could be deposited on the copper electrode before the test was prematurely terminated as a result of the formation of dendrites and/or nodules which bridged through the permeable membrane, effecting a short circuiting of the test cell.

Results equivalent to the above are obtained when in place of the additive of Example VI, any one of the following compounds are used:

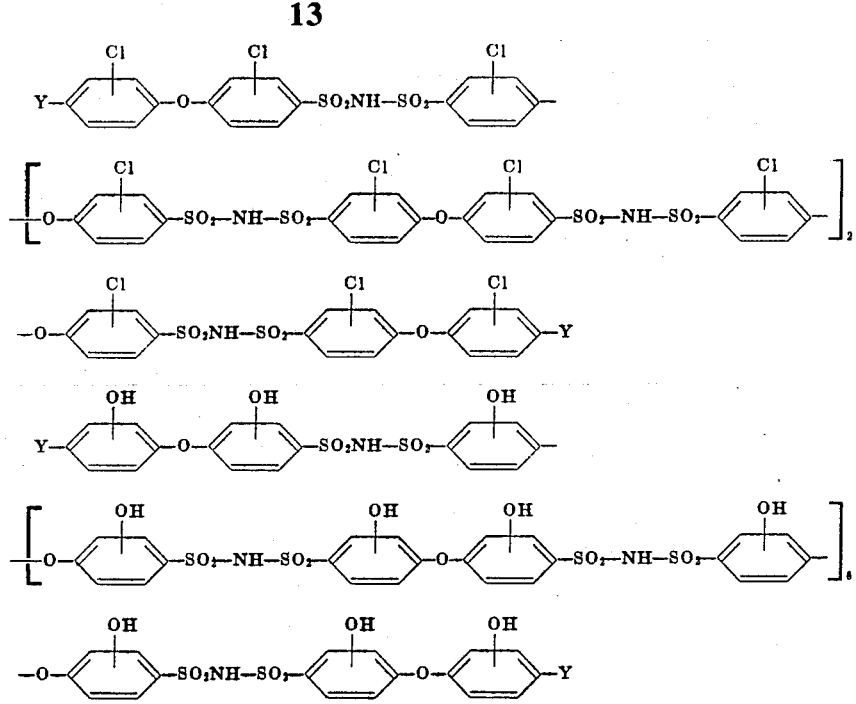

What is claimed is:

1. An electrolyte composition for use in an electric energy storage device comprising an aqueous solution containing a zinc halide wherein the halide is selected from a group consisting of chloride and bromide and an effective dendrite reducing amount of a soluble organic compound containing a group of a structure —$SO_2NH$— and a diaryl oxygen ether group.

2. The electrolyte as defined in claim 1 wherein said metal halide comprises zinc chloride.

3. The electrolyte as defined in claim 1 wherein said metal halide is present in a concentration of about 0.1 percent by weight up to saturation.

4. The electrolyte as defined in claim 1 wherein the soluble organic compound is present in a concentration of from about 0.001 to about 10 percent by weight.

5. The electrolyte as defined in claim 1 wherein the organic compound is present in a concentration of from about 0.005 to about 1 percent by weight.

6. The electrolyte as defined in claim 1 wherein the organic soluble compound is a diaryl ether, unsubstituted or substituted with a water solubilizing substituent or alkyl of one to four carbon atoms or a halogen.

7. The electrolyte of claim 1 wherein the —$SO_2NH$— group is a —$SO_2NHSO_2$— group.

8. The electrolyte of claim 1 wherein the organic compound is of the formula:

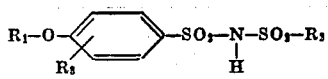

wherein $R_1$ is an aryl group or a group of the formula:

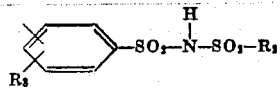

wherein $R_2$ may be an aliphatic group, aryl group or an aralkyl group;

$R_3$ is an alkyl of one to four carbon atoms, halogen, or a water solubilizing group.

9. The electrolyte of claim 8 wherein $R_1$ is an aryl group.

10. The electrolyte of claim 8 wherein $R_1$ is a group of the formula:

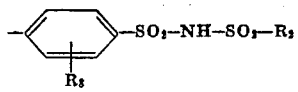

11. The electrolyte of claim 10 wherein $R_2$ is an aliphatic group.

12. The electrolyte of claim 10 wherein $R_2$ is an aryl group.

13. The electrolyte of claim 10 wherein $R_2$ is an aralkyl group.

14. An electric energy storage device comprising an electrode area having at least one positive and one negative electrode therein, wherein the negative electrode is comprised of a zinc surface, means for passing a halogen selected from the group consisting of chlorine and bromine into the electrode area, and the electrolyte of claim 1 in the electrode area.

15. The device of claim 14 wherein the halide substituent of said metal halide comprises chloride.

16. The device of claim 14 wherein the metal halide comprises zinc chloride.

17. The device of claim 14 wherein the metal halide is present in a concentration of about 0.1 percent by weight up to saturation.

18. The device of claim 14 wherein the soluble organic compound is present in a concentration of from about 0.001 to 10 percent by weight.

19. The device of claim 14 wherein the organic compound is present in a concentration of from about 0.005 to about 1 percent by weight.

20. The device of claim 14 wherein the organic soluble compound is a diaryl ether, unsubstituted or substituted with a water solubilizing substituent or alkyl of one to four carbon atoms or a halogen.

21. The device of claim 14 wherein the —$SO_2NH$— group is a —$SO_2NHSO_2$— group.

22. The device of claim 14, wherein the organic compound is of the formula:

$$R_1-O-\underset{R_3}{\underset{|}{\bigcirc}}-SO_2-\underset{|}{\overset{H}{N}}-SO_2-R_2$$

wherein $R_1$ is an aryl group or a group of the formula:

$$\underset{R_3}{\underset{|}{\bigcirc}}-SO_2-\underset{|}{\overset{H}{N}}-SO_2-R_2$$

wherein $R_2$ may be an aliphatic group, aryl group or an aralkyl group;

$R_3$ is an alkyl of one to four carbon atoms, halogen or a water solubilizing group.

23. The device of claim 22 wherein $R_1$ is an aryl group.

24. The device of claim 22 wherein $R_1$ is a group of the formula:

$$\underset{R_3}{\underset{|}{\bigcirc}}-SO_2-NH-SO_2-R_2$$

25. The device of claim 22 wherein $R_2$ is an aliphatic group.

26. The device of claim 22 wherein $R_2$ is an aryl group.

27. The device of claim 22 wherein $R_2$ is an aralkyl group.

28. An electrolyte composition for use in an electric energy storage device comprising an aqueous solution containing a zinc halide, wherein the halide is selected from the group consisting of chloride and bromide, and an effective dendrite reducing amount of a soluble organic compound of the formula:

$$Y-\underset{R_3}{\underset{|}{\bigcirc}}-O-\underset{R_3}{\underset{|}{\bigcirc}}-SO_2-NH-SO_2-\underset{R_3}{\underset{|}{\bigcirc}}-$$
$$\left[-O-\underset{R_3}{\underset{|}{\bigcirc}}-SO_2NHSO_2-\underset{R_3}{\underset{|}{\bigcirc}}-O-\underset{R_3}{\underset{|}{\bigcirc}}-SO_2-NH-SO_2-\underset{R_3}{\underset{|}{\bigcirc}}-\right]_n$$
$$-O-\underset{R_3}{\underset{|}{\bigcirc}}-SO_2-NH-SO_2-\underset{R_3}{\underset{|}{\bigcirc}}-O-\underset{R_3}{\underset{|}{\bigcirc}}-Y$$

wherein $R_3$ is an alkyl of one to four carbon atoms, halogen, or a water solubilizing group: Y is $-SO_3^-$ or $-SO_2NH_2$ and $n$ is from 1 to 10.

29. An electric energy storage device comprising an electrode area having at least one positive and one negative electrode therein, wherein the negative electrode is comprised of a zinc surface, means for passing halogen into the electrode area and an electrolyte of claim 28 in the electrode area.

30. The electrolyte of claim 28 wherein the organic compound is present in a concentration of from about 0.001 to about 10 percent by weight.

31. The electrolyte of claim 30 wherein the zinc halide is present in an amount ranging from about 10 to about 35 percent by weight.

32. An electrolyte composition for use in an electric energy storage device comprising an aqueous solution containing a zinc halide, wherein the halide is selected from the group consisting of chloride and bromide, and an effective dendrite reducing amount of a soluble organic compound of the formula:

$$-O_3S-R_4-\underset{|}{\overset{H}{N}}-SO_2-\underset{R_3}{\underset{|}{\bigcirc}}-O-\underset{R_3}{\underset{|}{\bigcirc}}-SO_2N-R_4-SO_3^-$$

wherein $R_3$ is an alkyl of one to four carbon atoms, halogen or a water solubilizing group;

$R_4$ is a straight or branched chain saturated alkylene of up to 12 carbon atoms, aryl, cyclic alkyl of from five to eight carbon atoms, or aralkyl of up to 12 carbon atoms.

33. An electric energy storage device comprising an electrode area having at least one positive and one negative electrode therein, wherein the negative electrode is comprised of a zinc surface, means for passing a halogen into the electrode area and an electrolyte of claim 32 in the electrode area.

34. The device of claim 33 wherein $R_4$ is a saturated alkylene group.

35. The device of claim 33 wherein $R_4$ is an aralkyl group.

36. The electrolyte of claim 32 wherein the zinc halide is present in a concentration of from about 0.001 to about 10 percent by weight.

37. The electrolyte of claim 36 wherein the zinc halide is present in an amount ranging from about 10 to about 35 percent by weight.

38. The electrolyte of claim 32 wherein $R_4$ is a saturated alkylene group.

39. The electrolyte of claim 32 wherein $R_4$ is an aralkyl group.

* * * * *